United States Patent [19]
Mech

[11] 3,831,576
[45] Aug. 27, 1974

[54] MACHINE AND METHOD FOR CUTTING BRITTLE MATERIALS USING A RECIPROCATING CUTTING WIRE

[75] Inventor: Harold W. Mech, Chicago, Ill.

[73] Assignee: Motorola, Inc., Franklin Park, Ill.

[22] Filed: July 9, 1973

[21] Appl. No.: 377,672

Related U.S. Application Data

[63] Continuation of Ser. No. 200,943, Nov. 22, 1971, abandoned.

[52] U.S. Cl.......................... 125/12, 125/16, 125/21
[51] Int. Cl............................................. B28d 1/08
[58] Field of Search ................. 125/12, 16, 18, 21; 51/262 A, 292, 263, 264

[56] References Cited
UNITED STATES PATENTS

| 2,780,038 | 2/1957 | Laverdisse | 51/264 X |
| 2,831,476 | 4/1958 | Wilson et al. | 125/12 |
| 2,994,314 | 8/1961 | Wayland | 125/21 |
| 3,155,087 | 11/1964 | Dreyfus | 125/21 |
| 3,525,324 | 8/1970 | Bonnefoy | 125/21 X |

FOREIGN PATENTS OR APPLICATIONS
756,195  8/1956  Great Britain.................. 125/12

OTHER PUBLICATIONS
Metzger, "An Electrolytic Saw," U.S. Dept. of Commerce Office of Tech. Services, PB 151574, 3-1958.

Primary Examiner—Al Lawrence Smith
Assistant Examiner—Nicholas P. Godici
Attorney, Agent, or Firm—Eugene A. Parsons; Vincent J. Rauner

[57] ABSTRACT

A web of wires defining a cutting area having a plurality of axially spaced apart wire portions formed by winding a continuous strand of wire around a plurality of elongated spaced apart pulleys, said continuous strand extending from a source of new wire and extending to take-up means. One of said elongated pulleys having a reversible motor attached thereto for causing the wire in the cutting area to continually move and periodically reverse directions. Mounting apparatus external of said web for fixedly holding a piece of material to be cut and moving the material into the cutting area in engagement with the wires therein at a generally uniform rate. Apparatus for supplying a continuous flow of cutting mixture, including relatively fine particles of cutting material and a relatively viscous carrying agent, to the cutting area and further apparatus for removing the cutting mixture from the wire as it leaves the cutting area, including a jet of gas directed onto the wire transverse to the longitudinal axis thereof, a bath for immersing the wire in a relatively low viscous fluid and a second jet of air directed onto the wire for removing the relatively low viscous mixture.

10 Claims, 6 Drawing Figures

MACHINE AND METHOD FOR CUTTING BRITTLE MATERIALS USING A RECIPROCATING CUTTING WIRE

This is a continuation of application Ser. No. 200943, filed Nov. 22, 1971 and now abandoned.

BACKGROUND OF THE INVENTION

1. Field of the Invention

A great number of small components, such as semiconductor devices, sensors, piezoelectric devices, crystals, etc., are presently utilized in electronics and many other fields. These components include thin, relatively small pieces of brittle materials which are extremely difficult to cut into the desired shapes. Further, in many instances the material is costly and substantial quantities of the material is wasted during the cutting procedure.

2. Description of the Prior Art

In the prior art a variety of saws for brittle materials have been developed wherein a continuous strand of thin, hard wire is guided over a plurality of pulleys to provide a plurality of parallel sections of wire spaced apart laterally a distance equal to the required thickness for the various components. In several of these prior art patents one of the pulleys is driven by a motor which is periodically reversed to reverse the direction of travel of the wires, relative to the material being cut, to provide the structure with a sawing action. In one other prior art device the material itself is periodically moved back and forth adjacent the sections of wires to provide the sawing action. For examples of these prior art devices, see U.S. Pat. No. 3,155,087, entitled "Machine For Sawing Samples Of Brittle Materials," issued to B. A. Dreyfus and U.S. Pat. No. 2,831,476, entitled "Crystal Cutting Saw," issued to Wilson et al.

A great many problems are prevalent in all of the prior art machines, only some of which are breakage of wires, unduly rapid wear of parts such as pulleys and wire guides, inconsistent thicknesses of saw cuts resulting in non-parallel edges of the material being cut, abrasive cutting mixture carried to parts of the machine external from the cutting area, etc. Some or all of these problems have combined in the prior art machines to render these machines impractical for commercial use.

SUMMARY OF THE INVENTION

The present invention pertains to an improved machine for cutting brittle materials and the like including continuous wire supply and take-up means having a plurality of wire guides mounted to define a continuous wire path therebetween and further defining a cutting area forming at least one side of an enclosed web, means external of said enclosed area and adjacent said cutting area for mounting the material to be cut and means for producing periodic relative back and forth movement between the wires of said web and the material holding means to provide a sawing action. The machine further includes means for supplying to said cutting area during cutting operations a relatively continuous flow of cutting mixture including relatively fine particles of cutting material having a substantially constant average size and a fluid carrying agent. The machine further includes apparatus for stripping the cutting mixture from the wires leaving the cutting area including a first jet of gas directed transversely onto the wire to remove substantial portions of the cutting mixture, a bath of fluid having a substantially lower viscosity than the carrying agent in the cutting mixture positioned to immerse the wire subsequent, in the path of travel, to the jet of gas and a second jet of gas positioned subsequent, in the path of travel, to the bath for removing the remaining low viscosity mixture.

It is an object of the present invention to provide an improved machine for cutting brittle materials.

It is a further object of the present invention to provide an improved machine for cutting brittle materials which produces a substantially uniform cut in the brittle materials.

It is a further object of the present invention to provide an improved machine for cutting brittle materials wherein cutting mixture is supplied to the cutting area so that the particles of cutting material in the mixture remain substantially the same average size during the cutting operation.

It is a further object of the present invention to provide an improved machine for cutting brittle materials wherein the material to be cut is fed into the cutting area, formed by a web of wires, external of the web to improve the stability of the device for mounting the materials and the web.

It is a further object of the present invention to provide an improved machine for cutting brittle materials wherein the cutting mixture is substantially completely removed from the wires leaving the cutting area to greatly increase the life of the machine and the parts therein.

These and other objects of this invention will become apparent to those skilled in the art upon consideration of the accompanying specification, claims and drawing.

BRIEF DESCRIPTION OF THE DRAWINGS

Referring to the drawings.

DESCRIPTION OF THE PREFERRED EMBODIMENT

Figure 1:
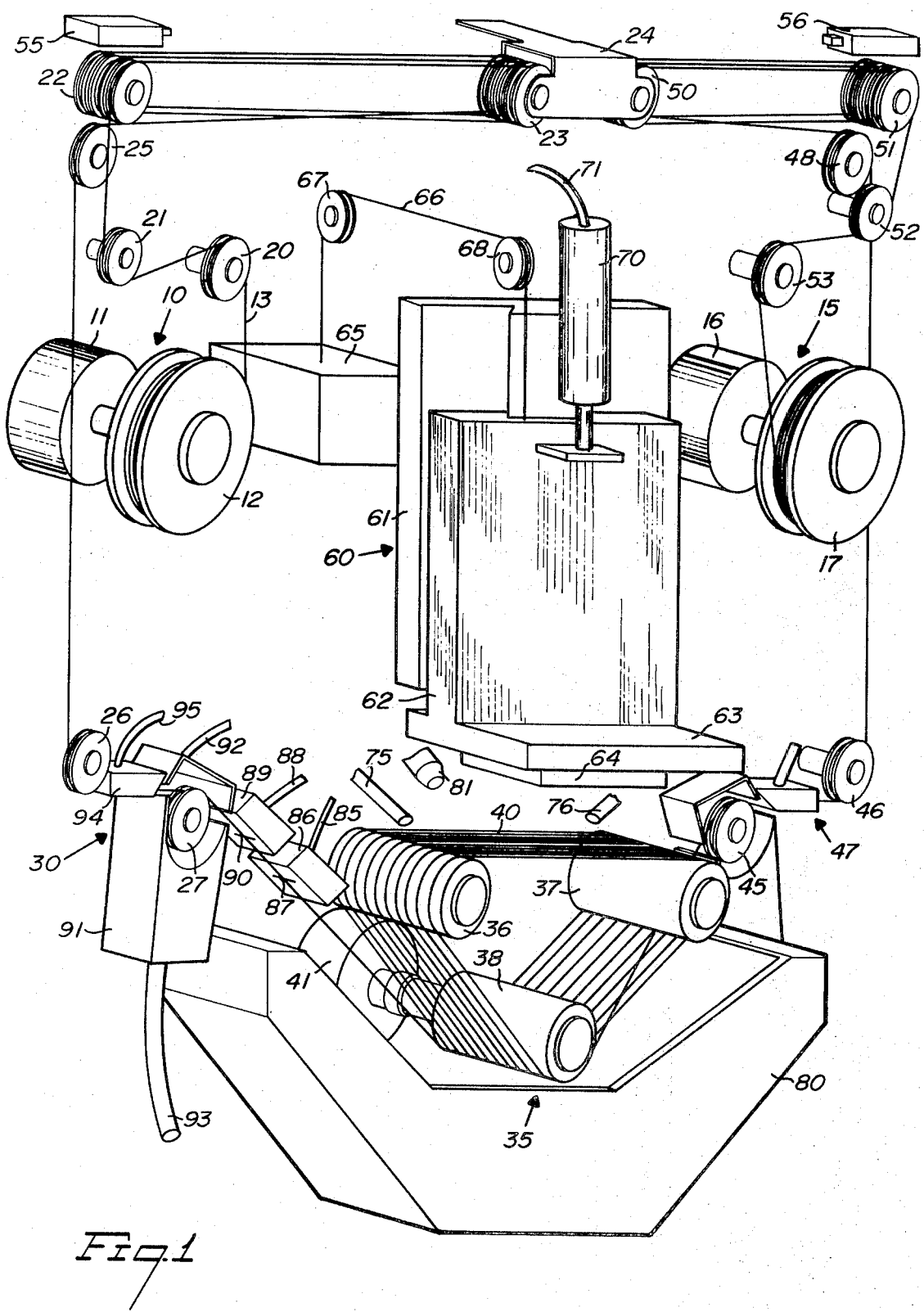
FIG. 1 illustrates semischematically a machine for cutting brittle materials including the improved features.

In FIG. 1 the numeral 10 generally designates continuous wire supply means, which in this embodiment includes a drive motor 11 having a spool 12 of new wire 13 affixed to the shaft thereof for rotation therewith. It should be understood that a variety of continuous wire supply means might be devised by those skilled in the art but the motor 11 and spool 12 are illustrated because of their simplicity and ease of control and handling. Take-up means, generally designated 15, include a drive motor 16 and a take-up spool 17 affixed to the shaft thereof for rotation therewith. The drive motors 11 and 16 are generally energized and controlled to maintain a substantially constant movement of the wire 13 therebetween during cutting operations. Further, it is desirable to maintain a substantially constant tension on the wire 13 between the spools 12 and 17.

The wire 13, extending from the spool 12, is threadedly engaged over two spaced apart wire guide idler pulleys 20 and 21 and extends to a fixedly positioned, rotatably mounted, multi-groove pulley 22. A multigroove pulley 23 is rotatably mounted on a carriage 24, which is in turn mounted for horizontal sliding movements toward and away from the pulley 22. The wire 13 extending to the pulley 22 is engaged over the pulleys 22 and 23 a plurality of times, somewhat in the fashion of a block and tackle, and extends therefrom over a wire guide idler pulley 25. From the idler pulley 25, the wire 13 extends downwardly to a pair of wire guide idler pulleys 26 and 27 located in a means generally designated 30 for stripping cutting mixture from the wire 13, which means 30 will be described in detail presently. The wire 13 extends from the means 30 to a web generally designated 35.

Web 35 includes three elongated generally parallel pulleys 36, 37 and 38 rotatably mounted at approximately the apexes of a triangle with an upper side lying approximately horizontally and in an upwardly directed relationship. Each of the pulleys 36, 37 and 38 has a plurality of grooves in the outer surface thereof and the wire 13 extending from the mixture stripping means 30 is engaged around the pulleys 36, 37 and 38 a plurality of times to form the web 35 defining an enclosed area therebetween. The wire 13 extending between the pulleys 36 and 37 in the upwardly directed flat side of the triangle defines a cutting area 40. It should be understood that other sides of the web 35 might be used for cutting areas but only the upper side is utilized to define cutting area 40 in this embodiment for simplicity of description. The pulley 38 is fixedly attached to the shaft of a drive motor 41, which upon proper energization rotates the pulley 38 and causes the wire 13 of the web 35 and especially the portions in the cutting area 40 to move at a substantially uniform speed.

The wire 13 leaving the web 35 passes across a pair of wire guide idler pulleys 45 and 46 located in a second means, generally designated 47, for stripping cutting mixture from the wire 13. Extending from the means 47, the wire 13 passes over a wire guide idler pulley 48 to a second pair of multigroove pulleys 50 and 51, having the wire 13 engaged therearound a plurality of times. The pulley 50 is rotatably mounted on the carriage 24 and the pulley 51 is rotatably mounted in a fixed position adjacent the extreme end of the path of travel for the carriage 24 (the pulley 22 being mounted at the opposite extreme end). The pulleys 50 and 51, having the wire 13 engaged thereover a plurality of times, again form a generally block and tackle type operation. The wire 13 extends from the pulley 51 over a pair of wire guide idler pulleys 52 and 53 to the take-up spool 17 to complete the path thereof. It should of course be understood that the path of the wire 13 illustrated is selected to incorporate the various features of the present machine and those skilled in the art may include a variety of modifications without departing from the scope of this invention.

A first reversing switch 55 is fixedly positioned adjacent pulley 22 and a second reversing switch 56 is fixedly positioned adjacent pulley 51 for engagement by carriage 24 as it approaches pulley 22 and pulley 56, respectively. The reversing switches 55 and 51 are connected into the energizing circuit for motor 41 to reverse the direction of rotation thereof each time one of the switches 55 or 56 is contacted by the carriage 24. The rotation of motor 41 causes movement of all of the wire 13 in web 35 and pulls the wire 13 from the pulley 22 or the pulley 51 to move the carriage 24 toward the pulley 22 or the pulley 51, respectively, depending upon the direction of rotation of the motor 41. When the motor 41 has rotated the web 35 sufficiently to cause the carriage 24 to contact the switch 55, the direction of rotation of the motor 41 is reversed by the switch 55 and the direction of movement of the wire in web 35 is reversed. This reversal causes the carriage 24 to begin to move toward the pulley 51 and, upon contact of the carriage 24 with the switch 56, the direction of the motor 41 is again reversed, which reverses the direction of movement of the wire 13 in the web 35. Thus, the direction of movement of the wire 13 in the cutting area 40 is periodically reversed to produce a sawing action. It should be understood that the wire 13 moves continuously from the spool 12 to the spool 17 at a substantially constant rate even though the direction of movement of the wire 13 in the web 35 is periodically reversed. Thus, new wire is continually supplied to the cutting area 40.

Means, generally designated 60, for mounting a piece of material to be cut are fixedly positioned generally above the cutting area 40. The mounting means 60 include a base 61 fixedly attached to the frame of the machine (not shown) or the like and a mounting block 62 dovetailed onto the base 61 for vertical sliding movements relative thereto. A mounting platform 63 is affixed to the lower end of the mounting block 62 and a piece 64 of material to be cut is fixedly attached to the downwardly directed surface of the platform 63 by any convenient means which will allow the removal of the piece 64 from the platform 63 when a cutting operation is completed. The base 61 of the mounting means 60 is positioned to allow vertical movement of the platform 63, and consequently the piece 64 of material to be cut, into and out of the cutting area 40. While the present embodiment illustrates the platform 63 mounted for vertical movement, it should be understood that the mounting means 60 might be positioned substantially anywhere along the flat open areas of the web 35 and, if desired, more than one mounting means 60 might be utilized in conjunction with the web 35.

Figure 2:
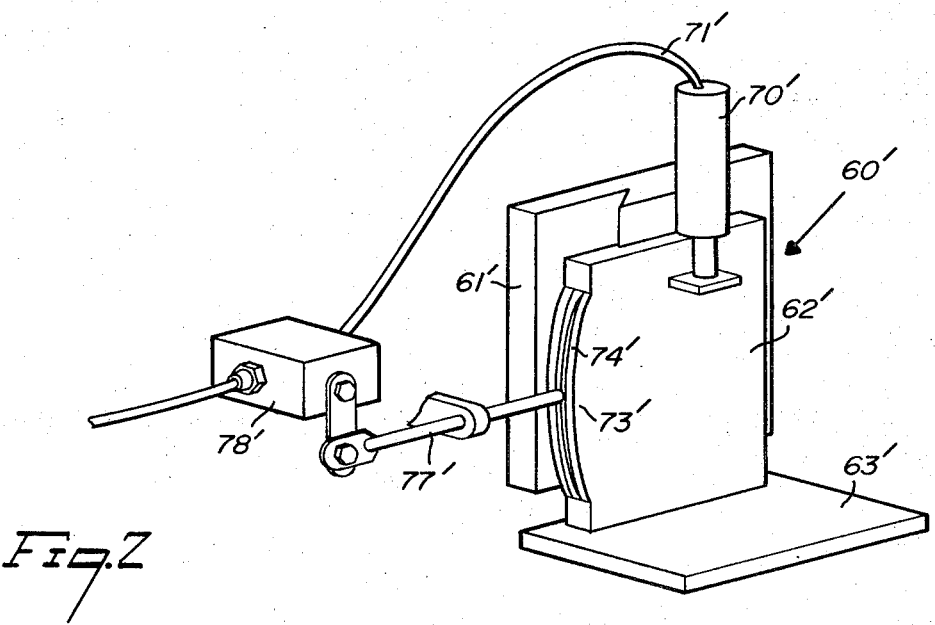
FIG. 2 illustrates the machine of FIG. 1 with a modification embodied therein.
Figure 3:
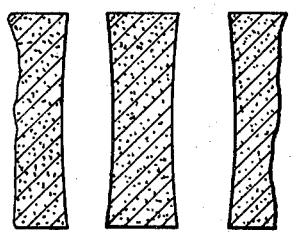
FIG. 3 is an enlarged cross sectional view of a portion of material with cuts therein illustrating a first type of cutting error.

A counterweight 65 is attached to the mounting block 62 by means of a cable 66 engaged over a pair of pulleys 67 and 68. The counterweight 65 is selected to bias the mounting block 62 and platform 63 slightly upwardly, or away from the cutting area 40. A fluid cylinder 70 is fixedly attached relative to the base 61 and the plunger thereof is attached to the mounting block 62 so as to force the mounting block 62 toward the cutting area 40 when the fluid cylinder 70 is activated by supplying fluid under pressure to an inlet hose 71. Thus, by supplying fluid under pressure to the hose 71 the mounting block 62 and platform 63 are forced toward the cutting area 40 at a substantially constant rate. When pressure on the fluid applied to the inlet hose 71 is reduced or removed the bias on the mounting block 62, provided by the counterweight 65, stops or reverses the direction of the platfrom 63. It has been found that the present machine cuts through pieces of material with varying configurations at varying rates. For example, when a cylindrical piece of material with a round cross section is cut perpendicular to the longitudinal axis, the machine cuts at a relatively high rate near both edges but slows down near the middle (at the high bulk of material). The wire has a tendency to make a narrower cut when it cuts faster and a wider cut when it cuts slower. Thus a machine which operates at a constant pressure will produce cuts as illustrated in FIG. 3 when cutting cylindrical (round) pieces of material because the cutting speed will vary. Apparatus illustrated in FIG. 2 is utilized to compensate for this cutting error and will be explained presently.

While those skilled in the art may devise a variety of mounting means for holding pieces of material to be cut and moving the pieces at a constant rate into the cutting area 40, it should be understood that positioning the mounting means 60 external of the enclosed area defined by the web 35 is believed to be a substantial improvement. Prior art devices mount the piece to be cut within the enclosed area and generally move the piece upwardly into the cutting area 40. By positioning the mounting means 60 external of the enclosed area, the web 35 can be constructed substantially smaller (only two pulleys need be utilized if desired) and the mountings for both the pulleys 36–38 and the mounting means 60 can be constructed much more ruggedly to substantially eliminate any possibility of slight unwanted movements. Further, one advantage of mounting the platform 63 above the cutting area 40 for vertical movements toward and away from the area 40 lies in the fact that the portions of wire 13 in the cutting area 40 back cut or remove material from the cuts in the piece 64 as the piece 64 is withdrawn vertically from the cutting area 40. Thus, the finished product is much cleaner and less work is required subsequent to the cutting operation.

A pair of conduits 75 and 76 each have one end directed into the cutting area 40, which end may contain a nozzle for controlling the spray pattern if desired, and the other end in communication with a source of cutting mixture (described presently). The cutting mixture includes relatively fine particles of cutting material, which may be for example silicon carbide or the like, and a fluid carrying agent, such as glycerine and propylene glycol or water, and the like. The glycerine adds viscosity to the fluid carrying agent so that the cutting mixture adheres to the wire 13 and carries the fine particles of cutting material with the wire 13 against the piece 64 to be cut. The viscosity of the fluid carrying agent is not critical but should be sufficient to readily carry the particles of cutting material with the wire 13 but the fluid agent should also have the property of flowing relatively fast so that fresh particles of cutting material can be continually introduced into the cut. Thus, the viscosity of the mixture is a tradeoff of characteristics and must be determined by the type of material being cut, the type of cutting material, the type of carrying agent, the speed of the wire 13, etc.

Figure 4:
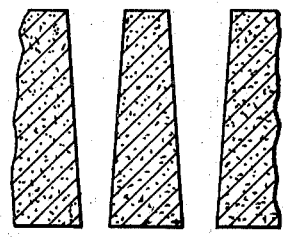
FIG. 4 is an enlarged cross sectional view of a portion of material with cuts therein illustrating a second type of cutting error.
Figure 5:
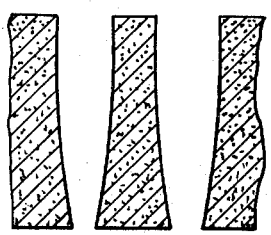
FIG. 5 is an enlarged cross sectional view of a portion of material with cuts therein illustrating a combination of the first and second types of cutting errors.

It has been found through substantial experimentation that, even though relatively hard cutting material is utilized, the fine particles in the mixture are gradually worn into even smaller particles. If the cutting mixture is recirculated too rapidly, as it is in prior art machines, the thickness of the cuts in the piece 64 gradually diminish as illustrated in FIG. 4. In a typical cutting operation the average diameter of the particles is 22 microns and the desired distance between cuts (thickness of the finished piece) is 6 mils with a tolerance of plus or minus one half mil. Thus, if the average diameter of the particles is reduced by wear as much as 10 percent the average diameter will be less than 20 microns and the width of the cut will diminish until the thickness of the piece exceeds 6.5 mils. It is, therefore, necessary to maintain the average particle size relatively constant throughout a cutting operation. This can be accomplished by providing a sufficient supply of slurry, in a recirculating system, to reduce the wear on individual particles below an allowable maximum during a single cutting operation. For example, the conduits 75 and 76 are connected to a 5 gallon (20 liters) supply of slurry in the present embodiment, with which the machine can cut for 3 hours without reducing the average size of the particles more than 1 percent. The conduits 75 and 76 may be connected to a supply of unused slurry which is not recirculated, as another example of means for supplying particles with a relatively constant average size. It should be understood that the term unused, in this disclosure, includes slurry not previously used and slurry not previously used during the particular cutting operation in progress (although the slurry might have been used during a prior cutting operation). As the cutting progresses the cutting mixture flows into a generally V-shaped receptacle 80, located below the web 35. The receptacle 80 may be in direct communication with a recirculating pump 82 by means of a conduit 83 or may simply be constructed sufficiently large to receive all of the cutting mixture required to complete a cutting operation. The outlet of the pump 82 is connected through a conduit 84 to a supply tank (not shown) or directly to the conduits 75 and 76 if the tank 80 is sufficiently large.

A nozzle 81 is connected to a supply of fresh water (not shown) and is directed into the cutting area 40 for washing the web 35 and piece 64 after the cutting operation. Once the wire in the web 35 has cut through the piece 64 to a predetermined distance the cutting mixture supplied by the conduits 75 and 76 is stopped (and removed from the container 80 if it is to be reused) and water is supplied through the nozzle 81. The platform 63 is then gradually raised so that the web 35 performs the back cutting operation, previously described, and the water from the nozzle 81 washes the particles from the piece 64. Because the pulleys 36, 37 and 38 are operating with substantial quantities of the cutting mixture thereon, the pulleys are press fit onto shafts which are rotatably mounted to a base structure (not shown). By press fitting the pulleys 36, 37 and 38 on rotatably mounted shafts there is little or no danger of the cutting mixture entering between the shaft surfaces and the inside diameters of the pulleys 36, 37 and 38 and producing wear or inoperation thereof.

The mixture stripping means 30 and 47 are substantially similar and, consequently, only the stripping means 30 will be described in detail with the understanding that the stripping means 47 contains similar parts and operates in a similar fashion. The wire 13 extends from the pulley 38 upwardly across the pulley 27 and beneath the pulley 26. When the carriage 24 is moving toward the pulley 51 and switch 56 the wire 13 is moving from the pulley 38 through the stripping means 30. A first conduit 85, attached at one end to a supply of gas, such as air or the like, under pressure has a plenum 86 attached to the other end thereof with a slit 87 therein for directing a jet of the gas onto the wire 13 transverse to the longitudinal axis thereof. With the jet of gas emanating from the slit 87 directed approximately perpendicular to the longitudinal axis or the wire 13, a substantial amount of the cutting mixture is stripped from the wire 13, which mixture then falls into the receptacle 80. A properly directed jet of air under suitable pressure may strip in the neighborhood of 90 percent of the cutting mixture from the wire 13.

A second conduit 88, attached at one end to the gas supply (not shown) and at the other end to a plenum 89 having a slit 90 therein for directing a jet of gas onto the wire 13, is positioned subsequent to the first conduit 85, in the direction of travel of the wire 13, and may be removed therefrom sufficiently to insure that any mixture stripped from the wire 13 by the jet of gas emanating from the slit 90 does not fall into the receptacle 80. Both of the plenums 86 and 89 are positioned between the pulley 38 and the pulley 27 along the wire 13. The operation of the plenum 89 and slit 90 will be described in detail presently.

A housing 91 substantially encloses the pulley 27, except for openings to accommodate the passage of the wire 13 from the pulley 38 over the pulley 27 to the pulley 26. A conduit 92 communicates with the internal chamber of the housing 91 through the upper wall thereof and the other end is connected to a supply of fluid (not shown) having a substantially lower viscosity than the viscosity of the fluid carrying agent in the cutting mixture, an example of such fluid is water or the like. A second conduit 93 is connected in communication with the internal chamber in the housing 91 through the lower wall thereof and the other end is connected to a drain. Thus, fluid such as water is introduced into the housing 91 to immerse the wire 13 and substantially lower the viscosity of mixture adhering thereto. A plenum 94 connected through a conduit 95 to a source of pressurized gas (not shown) has a slit therein (not shown) for directing a jet of air onto the wire 13 as it leaves the housing 91 and before engaging the pulley 26. Because the viscosity of the mixture adhering to the wire 13 is greatly reduced by immersing the wire in the low viscosity fluid, the jet of air from the plenum 94 removes substantially all of the cutting mixture from the wire 13. Thus, the wire 13 does not carry cutting mixture to the remaining components of the machine and the life of the wire and the machine is greatly increased.

When the carriage 24 reverses direction and proceeds toward the pulley 22 and switch 55 and the wire 13 travels from the pulleys 26 and 27 toward the pulley 38. The wire 13 is again immersed as it passes through the housing 91 and, therefore, the plenum 89 and jet directing slit 90 are positioned subsequent to the housing 91, in the direction of travel of the wire 13, to strip the low viscosity fluid from the wire 13 and prevent it from entering the web 35 to reduce the viscosity of the cutting mixture in the cutting area.

Referring to FIG. 2, another embodiment of the present invention is illustrated wherein similar parts are designated with similar numbers and all numbers have a prime added to indicate a different embodiment. Included are means, generally designated 60', for mounting a piece of material to be cut. The means 60' include a base 61' with a mounting block 62' dovetailed thereto for vertical sliding movements. A platform 63' is affixed to the lower end of the block 62' and adapted to have material to be cut affixed to the lower surface thereof. A fluid cylinder 70' is fixed to the base 61' and the plunger thereof is fixed to the block 62'. A fluid supply hose 71' for the cylinder 70' is connected through a pressure regulating valve 72' to a source of fluid under pressure (not shown). A member 73' having a cam surface 74' is affixed to the side of the block 62'. The cam surface 74' is preconstructed according to the cross section of the material being cut, the type of material, the speed of the wire, etc. A linking mechanism 77' is mounted adjacent the block 62' in contact with the cam surface 74' and connected to a control member 78' (which may be a shaft or the like) on the valve 72'. As the cam surface 74' moves past the linking mechanism 77' the control member 78' is moved to vary the pressure on the fluid in the conduit 71' to maintain the speed of downward movement of the block 62' relatively constant. While specific apparatus for controlling the speed of the block 62' is illustrated, it should be understood that one skilled in the art might devise a variety of modifications, etc. Other possible embodiments might include electronic or light sensors to determine the movement, position and/or speed of the material into the cutting area. By controlling the speed of insertion of the material into the cutting area, the cutting error illustrated in FIG. 3 can be greatly reduced or eliminated.

Figure 6:
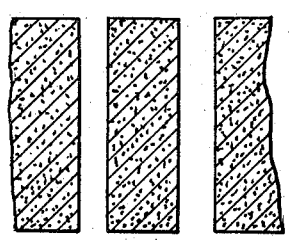
FIG. 6 is an enlarged cross sectional view of a portion of material cut with the present machine.

Thus, an improved machine for cutting brittle materials is disclosed wherein the materials may be more accurately cut and cleaned upon cutting, the thickness of the cut is retained substantially constant, as illustrated in FIG. 6, to ensure that opposite sides of the cut material are substantially parallel and the cutting mixture is excluded from substantially all parts of the machine except the cutting area to greatly increase the life of the machine. Further, because the pieces of material to be cut are applied to the cutting web external of the enclosed area, the application can be performed with more precision and uniform cutting speed.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. An improved machine for cutting brittle materials comprising:
   a. continuous wire supply means;
   b. take-up means for used wire;
   c. a plurality of wire guides defining a continuous wire path between said wire supply means and said take-up means, said wire guides including a plurality of elongated pulley means having a plurality of portions of the wire extending therebetween in parallel, laterally spaced apart relationship to define an enclosed area at least one side of which defines a generally horizontally oriented cutting area;
   d. material mounting means mounted above and external of said enclosed area for relative, generally vertical movements toward and away from said cutting area, said material mounting means being constructed for rigidly affixing for movement into and out of said cutting area pieces of material to be cut; and e. means for producing relative reciprocating movements between wire in said cutting area and the material to be cut.

2. An improved machine as set forth in claim 1 wherein the material mounting means includes a material mounting block slideably mounted for movement toward and away from said cutting area, biasing means attached to said block and biasing said block outwardly away from said cutting area, and power means for moving said block inwardly toward said cutting area upon energization thereof.

3. An improved machine as set forth in claim 2 wherein the biasing means includes a counterweight.

4. An improved machine for cutting brittle materials comprising:
  a. continuous wire supply means;
  b. take-up means for used wire;
  c. a plurality of wire guides defining a continuous wire path between said wire supply means and said take-up means and further defining a cutting area;
  d. material mounting means for rigidly affixing adjacent said cutting area pieces of material to be cut;
  e. said material mounting means and the wire within said cutting area being further mounted for relative converging and diverging movements;
  f. means for producing relative reciprocating movements between wire in said cutting area and the piece of material to be cut;
  g. means for supplying to said cutting area during cutting operations a relatively continuous flow of cutting mixture including fine particles of cutting material;
  h. container means positioned generally beneath said cutting area for receiving used cutting mixture; and
  i. stripping means oriented adjacent the continuous wire path on each side of said cutting area for stripping the cutting mixture from said wire extending from the cutting area, said stripping means including jets of gas directed onto said wire and generally perpendicular to the longitudinal axis of said wire, said jets being positioned generally above said container means for returning the cutting mixture to said container means.

5. An improved machine as set forth in claim 4 wherein the mixture stripping means includes means directing a jet of gas onto the wire and generally perpendicular to the longitudinal axis of said wire; means immersing a portion of said wire, subsequent to the gas jet directing means in the direction of travel, in a fluid selected to reduce the viscosity of the carrying agent of the mixture; and means directing a jet of gas onto said wire, subsequent to the immersion thereof in the direction of travel, for stripping the remaining reduced viscosity mixture from the wire.

6. An improved machine as set forth in claim 5 wherein the gas utilized in the jet directing means includes air and the viscosity reducing fluid includes water.

7. An improved method of cutting brittle materials comprising the steps of:
  a. mounting at least one wire tautly between spaced apart supports;
  b. providing means for rigidly mounting a piece of material to be cut adjacent the wire;
  c. reciprocating one of the wire and the mounting means relative to the other and parallel to the longitudinal axis of the wire to provide a sawing action;
  d. moving the piece of material to be cut against the wire in a direction generally perpendicular to the longitudinal axis of the wire;
  e. supplying a cutting mixture, including a fluid carrying agent and fine particles of cutting material, to the juncture of the wire and the piece of material to be cut; and
  f. controlling the supply of mixture so that the average size of the fine particles remains approximately constant for the duration of a cutting operation.

8. An improved method of cutting brittle materials as set forth in claim 7 including the steps of moving the piece of material against the wire with a pressure sufficient to produce cutting of the piece and controlling the pressure to provide a substantially uniform cut.

9. An improved method of cutting brittle materials as claimed in claim 7 wherein the supply of mixture is controlled to maintain the average size of the fine particles throughout a cutting operation within 10 percent of the average size of the fine particles at the beginning of the operation.

10. An improved method of cutting brittle materials comprising the steps of:
  a. mounting at least one wire tautly between spaced apart supports;
  b. providing means for rigidly mounting a piece of material to be cut adjacent the wire;
  c. reciprocating one of the wire and the mounting means relative to the other and parallel to the longitudinal axis of the wire to provide a sawing action;
  d. moving the piece of material to be cut against the wire in a direction generally perpendicular to the longitudinal axis thereof and with sufficient pressure to produce cutting of the piece;
  e. supplying a cutting mixture, including a fluid carrying agent and fine particles of cutting material, to the juncture of the wire and the piece of material to be cut; and
  f. controlling the pressure between the piece and the wire to provide a substantially uniform cut including the steps of determining approximate variations of speed of cutting throughout the cutting operation prior to performing the cutting operation, sensing the position of the piece of material relative to the wire throughout the cutting operation and adjusting the pressure between the piece and the wire in accordance with the predetermined variations.

* * * * *

UNITED STATES PATENT AND TRADEMARK OFFICE
CERTIFICATE OF CORRECTION

PATENT NO. : 3,831,576
DATED : AUGUST 27, 1974
INVENTOR(S) : HAROLD W. MECH

It is certified that error appears in the above-identified patent and that said Letters Patent are hereby corrected as shown below:

In column 6, line 30, delete "82" and insert --(not shown)--.

In column 6, line 31, delete "83" and insert --(not shown)--.

In column 6, line 33, delete "82".

In column 6, line 34, delete "84".

In column 8, line 6, delete "72'" and insert --78'--.

In column 8, line 14, delete "78'".
    In column 8, line 16, delete "78'".

Signed and Sealed this

Tenth Day of January 1978

[SEAL]

Attest:

RUTH C. MASON
*Attesting Officer*

LUTRELLE F. PARKER
*Acting Commissioner of Patents and Trademarks*